(12) United States Patent
Iida

(10) Patent No.: US 7,460,171 B2
(45) Date of Patent: Dec. 2, 2008

(54) LENS APPARATUS HAVING STOP BLADE, OPTICAL FILTER AND SHUTTER BLADE

(75) Inventor: Seiji Iida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 819 days.

(21) Appl. No.: 10/693,471

(22) Filed: Oct. 24, 2003

(65) Prior Publication Data

US 2004/0085473 A1 May 6, 2004

(30) Foreign Application Priority Data

Oct. 31, 2002 (JP) .............................. 2002-318096

(51) Int. Cl.
*H04N 5/225* (2006.01)
(52) U.S. Cl. .................. 348/374; 348/342; 348/363
(58) Field of Classification Search ............... 348/342, 348/360, 363, 374
See application file for complete search history.

(56) References Cited

U.S. PATENT DOCUMENTS

| | | | |
|---|---|---|---|
| 6,753,911 B1 * | 6/2004 | Yamada et al. | 348/240.3 |
| 7,071,973 B1 * | 7/2006 | Yoshioka et al. | 348/219.1 |
| 2001/0017662 A1 * | 8/2001 | Nomura et al. | 348/358 |
| 2001/0038414 A1 * | 11/2001 | Hofer et al. | 348/207 |
| 2005/0179779 A1 * | 8/2005 | Oochi et al. | 348/207.99 |

* cited by examiner

*Primary Examiner*—Lin Ye
*Assistant Examiner*—Gevell Selby
(74) *Attorney, Agent, or Firm*—Cowan, Liebowitz & Latman, P.C.

(57) ABSTRACT

A lens apparatus capable of efficiently arranging a stop blade, an optical filter and a shutter blade to reduce the size of the apparatus is disclosed. The lens apparatus comprising a lens, a lens holding member which holds the lens, a stop blade which changes an area of a light-passing aperture, an optical filter which inserts and removes with respect to a region opposed to the light-passing aperture and a shutter blade which opens and closes the light-passing aperture. Here, at least one member of the stop blade, the optical filter and the shutter blade is arranged at one end side of the lens holding member and the other member is arranged at the other end side of the lens holding member.

9 Claims, 10 Drawing Sheets

LENS APPARATUS HAVING STOP BLADE, OPTICAL FILTER AND SHUTTER BLADE

BACKGROUND OF THE INVENTION

1. Field of the Invention

The present invention relates to a structure of a lens apparatus of camera which takes an object image.

2. Description of the Related Art

The number of pixels of an image pickup element (CCD, etc.) for an electronic camera represented by a digital camera is significantly increasing in recent years and its pixel pitch has a tendency to reduce rapidly. On the other hand, there is a lens barrel of a camera having an iris diaphragm having a stop blade with an opening or a plurality of stop blades, gradually changing the stop diameter to restrict the quantity of light incident on an image plane and arranged in an optical path.

Light has properties of a wave and it is a well-known fact that these properties become conspicuous when the diameter of the aperture stop falls below a certain value, that is, a phenomenon of diffraction takes place. Here, when the pixel pitch of the image pickup element is reduced, the image pickup element can even capture a high frequency area, but in this high frequency area it receives strong influences of diffraction and resolution (image quality) deteriorates drastically.

For this reason, for the purpose of suppressing deterioration of the image quality, it is not possible to reduce the aperture of the stop when the pixel pitch of the image pickup element is small.

Therefore, when the aperture is small, a structure in which an ND (Neutral Density) filter structured integral with the stop blade is moved into the optical path is used. The ND filter has an effect of restricting the amount of transmitted light and can thereby perform effective light quantity control without the need to reduce the aperture of the stop and suppress aforementioned deterioration of the image quality.

Restricting the light quantity is not simply limited to the effect of appropriate exposure, but also has the effect of actually adding various effects to photographic expressions by a photographer, which constitutes an important factor. For example, photographic expressions using various image taking methods are required such as highlighting an object by fully opening the stop, clearly describing all parts of scenery with the stop stopped down, increasing the shutter speed with an increased light quantity, slowing down the shutter speed with a reduced light quantity or the like.

However, the stop provided with an ND filter as an integral part is subject to many restrictions on photographic expressions such that there is only one diameter of a reduced aperture to adjust the light quantity with the ND filter or it is not possible to reduce the light quantity with the stop fully opened. That is, the conventional ND filter is used to suppress deterioration of the image quality in a small aperture state and not intended to actively create or edit pictures.

Thus, there is a demand for a lens barrel having an iris diaphragm capable of a multi-stage setting of the stop diameter and a ND filter adjusting the quantity of transmitted light respectively, but it is difficult to arrange a driving unit for the stop and a driving unit for the ND filter within the limited space in the lens barrel.

Furthermore, when the stop unit, shutter unit and ND unit are held in the same lens holding frame for a purpose of reducing a size of the lens barrel, the overall weight of the lens holding frame increases, which causes a problem that when external shock is given to the lens barrel, the lens holding frame is tilted with respect to the optical axis because of this weight.

SUMMARY OF THE INVENTION

One aspect of the lens apparatus of the present invention comprises a lens, a lens holding member which holds the lens, a stop blade which changes an area of a light-passing aperture, an optical filter which inserts and removes with respect to a region opposed to the light-passing aperture and a shutter blade which opens and closes the light-passing aperture. Here, at least one member of the stop blade, the optical filter and the shutter blade is arranged at one end side of the lens holding member and the other member is arranged at the other end side of the lens holding member.

One aspect of the camera of the present invention comprises a lens, a lens holding member which holds the lens, a stop blade which changes an area of a light-passing aperture, an optical filter which inserts and removes with respect to a region opposed to the light-passing aperture, a shutter blade which opens and closes the light-passing aperture and an image pickup element which photoelectrically converts an object image formed by the lens into an electric signal. Here, at least one member of the stop blade, the optical filter and the shutter blade is arranged at one end side of the lens holding member and the other member is arranged at the other end side of the lens holding member.

One aspect of the camera system of the present invention comprises the above described lens apparatus and a camera comprising an image pickup element which photoelectrically converts an object image formed by the lens in the lens apparatus into an electric signal.

A detailed configuration of the lens apparatus, camera and camera system of the present invention, the above and other objects and features of the invention will be apparent from the embodiment, described below.

DETAILED DESCRIPTION OF THE PREFERRED EMBODIMENT

Figure 1A:
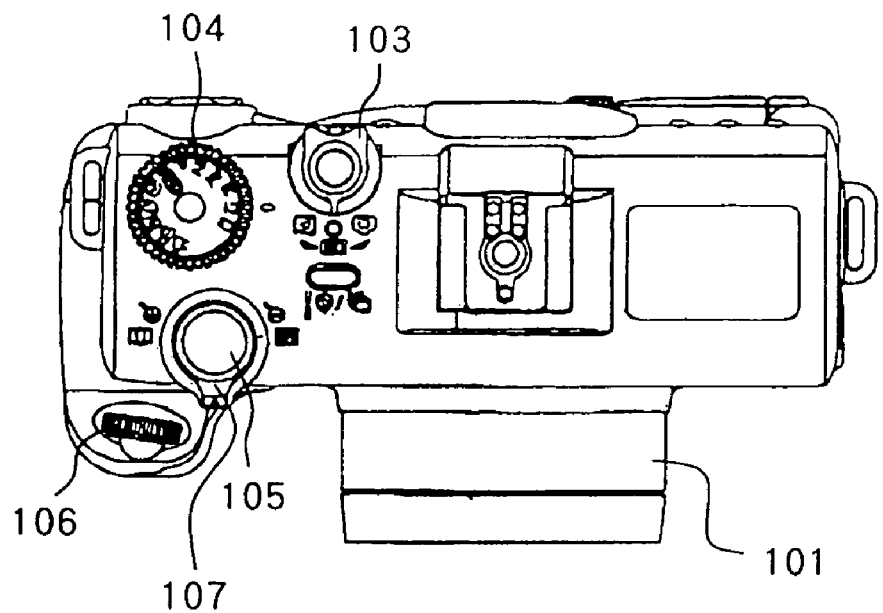
FIGS. 1A and 1B are a top view and a front view of a camera.

A lens barrel which is an embodiment of the present invention will be explained. FIG. 1 shows an external view of a camera provided with the lens barrel which is this embodiment. In FIG. 1A is a top view of a camera and FIG. 1B is a front view of the camera.

Figure 1B:
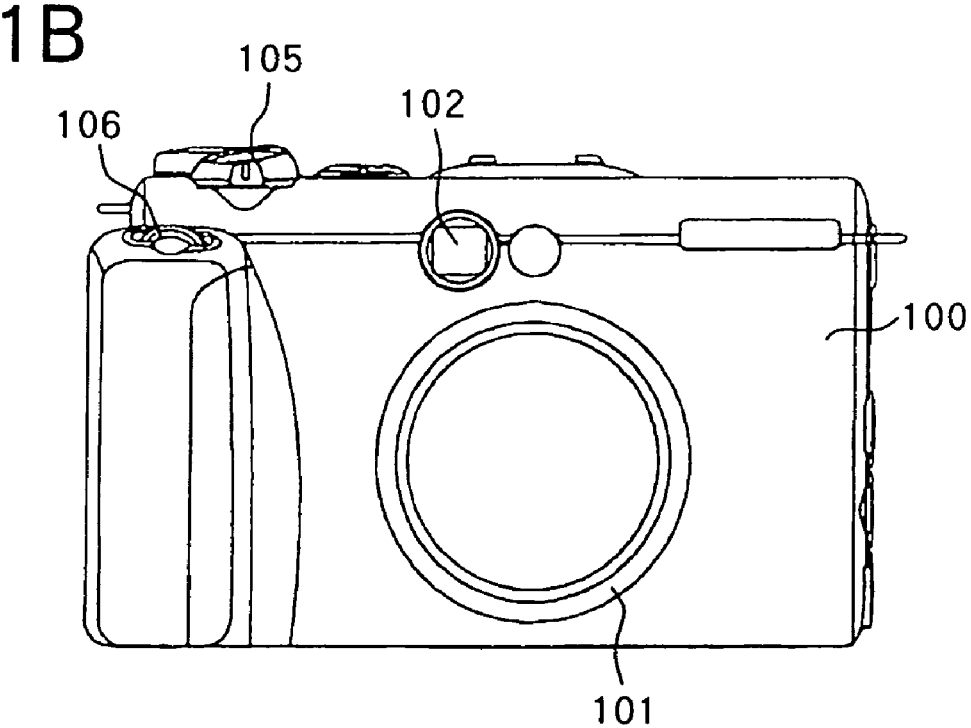

In FIGS. 1A and 1B, a lens barrel 101 is provided substantially at the center viewed from the front of a camera body 100 and a finder 102 is provided at the upper left of the lens barrel 101. Reference numeral 103 denotes a power switch, which sets a replay mode (mode to replay and display a captured image) when turned clockwise in FIG. 1A and sets an image-taking mode when turned counterclockwise in FIG. 1A.

Reference numeral 104 denotes a mode dial, which is a dial to select various image-taking modes. Reference numeral 105 denotes a release button, on the circumference of which a zoom key 107 is provided in a manner rotatable with respect to the camera body 100 and it is possible to change the focal length of the image-taking optical system to the telephoto side or wide-angle side according to the rotation direction of the zoom key 107. Reference numeral 106 denotes an electronic dial, which allows, when turned, various operations such as changing an aperture value or shutter speed.

Figure 2:
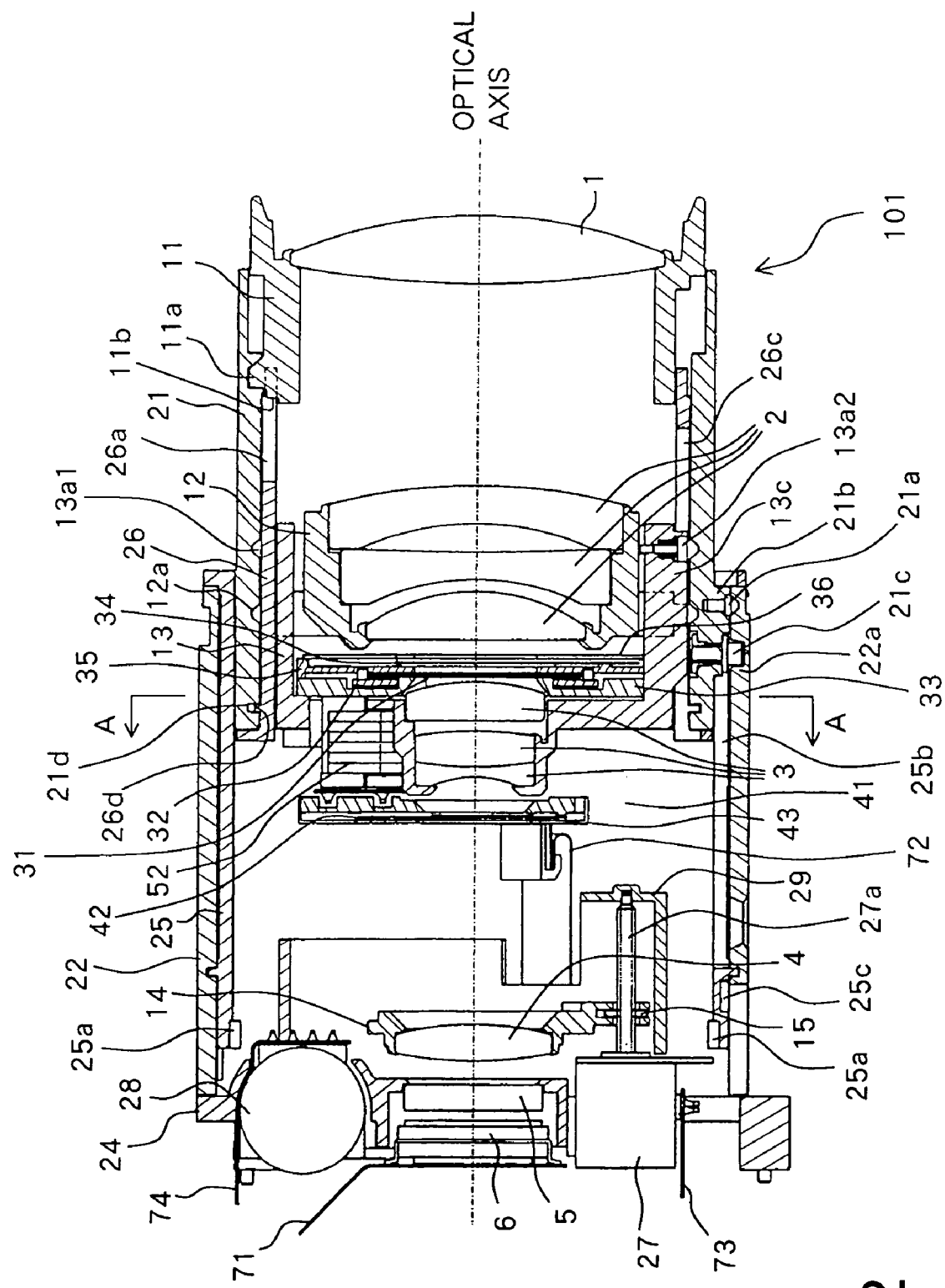
FIG. 2 is a sectional view of a lens barrel.

FIG. 2 shows a sectional view of the lens barrel 101.

In FIG. 2, reference numerals 1, 2 and 3 denote a first lens unit, a second lens unit and a third lens unit respectively, which move in the direction of the optical axis to perform a variable power operation. Reference numeral 4 denotes a fourth lens unit which is responsible for focusing and image plane correction, 5 denotes a low pass filter and 6 denotes an image pickup element (CCD or CMOS sensor, etc.) arranged on the image forming plane of a light flux from an object.

Reference numerals 11, 12, 13 and 14 denote a first holding barrel, a second holding barrel, a third holding barrel and a fourth holding barrel which hold the lens units 1 to 4 respectively. The first holding barrel 11, second holding barrel 12 and third holding barrel 13 are arranged inside a movable cam ring 21 and engage with cam groove portions formed in the inner surface of the movable cam ring 21.

Reference numeral 22 denotes a fixed barrel and the movable cam ring 21 engages with a cam groove portion formed in the inner surface thereof. The movable cam ring 21 is movable in the direction of the optical axis through the engagement with the cam groove portion of the fixed barrel 22. Reference numeral 24 denotes a holder to which the fixed barrel 22 is fixed. The holder 24 holds the low pass filter 5 and the image pickup element 6.

Reference numeral 25 denotes a driving ring which rotates the movable cam ring 21 around the optical axis. Reference numeral 26 denotes a rectilinear propagation guide ring which blocks the rotation of the first holding barrel 11, second holding barrel 12 and third holding barrel 13 around the optical axis and moves these holding barrels 11 to 13 in the direction of the optical axis. Reference numeral 27 denotes a focus motor which drives the fourth holding barrel 14, 28 denotes a zoom motor which drives the driving ring 25 and these motors 27 and 28 are fixed to the holder 24.

Reference numeral 71 denotes a flexible printed wiring board (hereinafter referred to as "FPC") which transmits an output signal of the image pickup element 6 to the camera body side. A signal processing circuit (not shown) provided on the camera body side receives an image signal from the image pickup element 6 through the FPC 71, performs predetermined processing and then displays this image on a display section provided in the camera body or records it in a recording medium housed in the camera body.

Reference numeral 72 denotes an FPC which transmits a driving signal from the camera body side to the stop shutter unit and the ND unit. Reference numerals 73 and 74 denote FPCs which supply power to the focus motor 27 and the zoom motor 28, respectively.

The operation of the lens barrel with the above described structure will be explained. In a camera provided with the lens barrel of this embodiment, when power is OFF, the lens barrel is housed inside the camera body (in a collapse state). When power is turned ON, the lens barrel moves in the direction of the optical axis from the collapse state into an image-taking state. In the image-taking state, it is possible to perform a zooming operation by moving the lens barrel forward or backward in the direction of the optical axis.

The driving force of the zoom motor 28 is transmitted to a driving gear (not shown) through a gear system (not shown). Here, the driving gear engages with an inner gear 25a formed on the inner surface of the driving ring 25, and therefore the driving ring 25 receives a driving force from the zoom motor 28 and rotates around the optical axis.

An outer gear 25c is formed on the external surface of the driving ring 25 and the outer gear 25c is at a position shifted from the position of the inner gear 25a in the direction of the optical axis (object side). Forming the outer gear 25c at a position shifted from the inner gear 25a in the direction of the optical axis makes it possible to set the thickness of the driving ring 25 to such a thickness that allows one gear (outer gear 25c or inner gear 25a) to be formed and reduce the thickness of the driving ring 25 compared to a case where the two gears 25c and 25a are formed at the same position in the direction of the optical axis.

Here, shifting the two gears 25a and 25c away from each other in the direction of the optical axis makes it possible to substantially equalize a pitch circle diameter of the inner gear 25a to that of the outer gear 25c irrespective of the thickness of the driving ring 25 or increase either one of the two gears 25a and 25c depending on the module setting of the gears 25a and 25c and the thickness of the driving ring 25.

The driving ring 25 is coupled with a driven unit arranged in the camera body, for example, a finder unit through a gear train. More specifically, the outer gear 25c engages with one gear of the gear train coupled with the finder unit and when the driving ring 25 rotates around the optical axis, this rotational force is transmitted to the finder unit. In the finder unit, the transmitted force allows zooming in the finder optical system.

The driving ring 25 is provided with three rectilinear propagation guide groove portions 25b which extend in the direction of the optical axis with a uniform width. Three cam followers 21a are provided on the external surface of the movable cam ring 21. These cam followers 21a engage with the three inner cam groove portions formed on the inner surface of the fixed barrel 22 respectively. The cam followers 21a move along the inner cam groove portions of the fixed barrel 22 respectively, according to the rotation of the driving ring 25 around the optical axis. In this way, the movable cam ring 21 rotates around the optical axis.

A guide portion 21b formed integral with the movable cam ring 21 is provided in the vicinity of the cam followers 21a and the guide portion 21b engages with the rectilinear propagation guide groove portion 25b of the driving ring 25 in a slidable manner.

When the driving ring 25 receives a driving force from the zoom motor 28 and rotates around the optical axis, the movable cam ring 21 rotates around the optical axis through the engagement between the rectilinear propagation guide groove portion 25b and the guide portion 21b. As shown above, when the movable cam ring 21 rotates around the optical axis, the cam followers 21a move along the inner cam groove portions of the fixed barrel 22, and therefore the movable cam ring 21 moves in the direction of the optical axis while rotating around the optical axis.

On the other hand, in the movable cam ring 21, a pin 21c is provided in the vicinity of the cam followers 21a and the pin 21c is fitted in a groove portion 22a formed on the inner surface of the fixed barrel 22 with a certain gap. In this structure, when the lens barrel receives external shock, the pin 21c contacts the end surface of the groove portion 22a and absorbs the shock and thereby prevents the cam followers 21a from disengaging from the inner cam groove portions of the fixed barrel 22.

A guide groove portion 21d having a uniform width is formed on the circumference of the inner surface of the movable cam ring 21 and a projection 26d provided on the external surface of the rectilinear propagation guide ring 26 engages with the guide groove portion 21d in a slidable manner. This causes the rectilinear propagation guide ring 26 to slide in response to the rotation of the movable cam ring 21.

The rectilinear propagation guide ring 26 is prevented from rotating around the optical axis by rotation prevention keys 61 and 62 (see FIG. 9) which extend in the direction of the optical axis as will be described later and is movable only in the direction of the optical axis. For this reason, when the movable cam ring 21 moves in the direction of the optical axis while rotating around the optical axis, the rectilinear propagation guide ring 26 only moves in the direction of the optical axis without rotating around the optical axis.

Cam followers 11a, 12a and 13a formed on the external surface of the first holding barrel 11, second holding barrel 12 and third holding barrel 13 respectively engage with the cam groove portions formed on the inner surface of the movable cam ring 21.

Here, the cam followers 11a are formed integral with the external surface of the first holding barrel 11 and are provided at three locations in the circumferential direction of the first holding barrel 11. The cam followers 12a are formed integral with the external surface of the second holding barrel 12 and consist of cam followers provided at two locations in the circumferential direction of the second holding barrel 12 and a movable cam follower pressed against the cam groove portion of the movable cam ring 21 by means of a spring force. The cam followers 13a is formed integral with the external surface of the third holding barrel 13 and consists of cam followers 13a1 provided at two locations in the circumferential direction of the third holding barrel 13 and a movable cam follower 13a2 pressed against the cam groove portion of the movable cam ring 21 by means of a spring force.

Rectilinear propagation guide groove portions 26a, 26b and 26c extending in the direction of the optical axis with a predetermined width are formed in the rectilinear propagation guide ring 26. Part of the first holding barrel 11, part of the second holding barrel 12 and a rib 13c formed on the third holding barrel 13 engage with these rectilinear propagation guide groove portions 26a, 26b and 26c respectively in a slidable manner.

As described above, since part of the first holding barrel 11, part of the second holding barrel 12 and the rib 13c of the third holding barrel 13 engage with these rectilinear propagation guide groove portions 26a, 26b and 26c extending in the direction of the optical axis respectively, the holding barrels 11, 12 and 13 do not rotate around the optical axis but can move only in the direction of the optical axis. Then, the holding barrels 11, 12 and 13 move in the direction of the optical axis through the engagement between the cam followers 11a, 12a, 13a and the cam groove portions of the movable cam ring 21. This structure allows the first lens unit 1, second lens unit 2 and third lens unit 3 to move to a position according to a desired focal length.

In this embodiment, the cam followers 11a have a plane perpendicular to the optical axis. Furthermore, as shown in the inner exploded view of the movable cam ring 21 in FIG. 3, the cam groove portions 21f of the movable cam ring 21 which engages with the cam followers 11a has no gradient between the WIDE position and the TELE position. That is, the area between WIDE and TELE of the cam groove portion 21f is located within the plane perpendicular to the optical axis.

When the lens barrel is in a state capable of image-taking (between the WIDE state and TELE state), the above described structure prevents the cam followers 11a from coming off the cam groove portions 21f when external shock is added to the lens barrel by the cam followers 11a contacting the cam groove portions 21f in the direction perpendicular to the cam groove portions 21f (direction of the optical axis).

Figure 3:
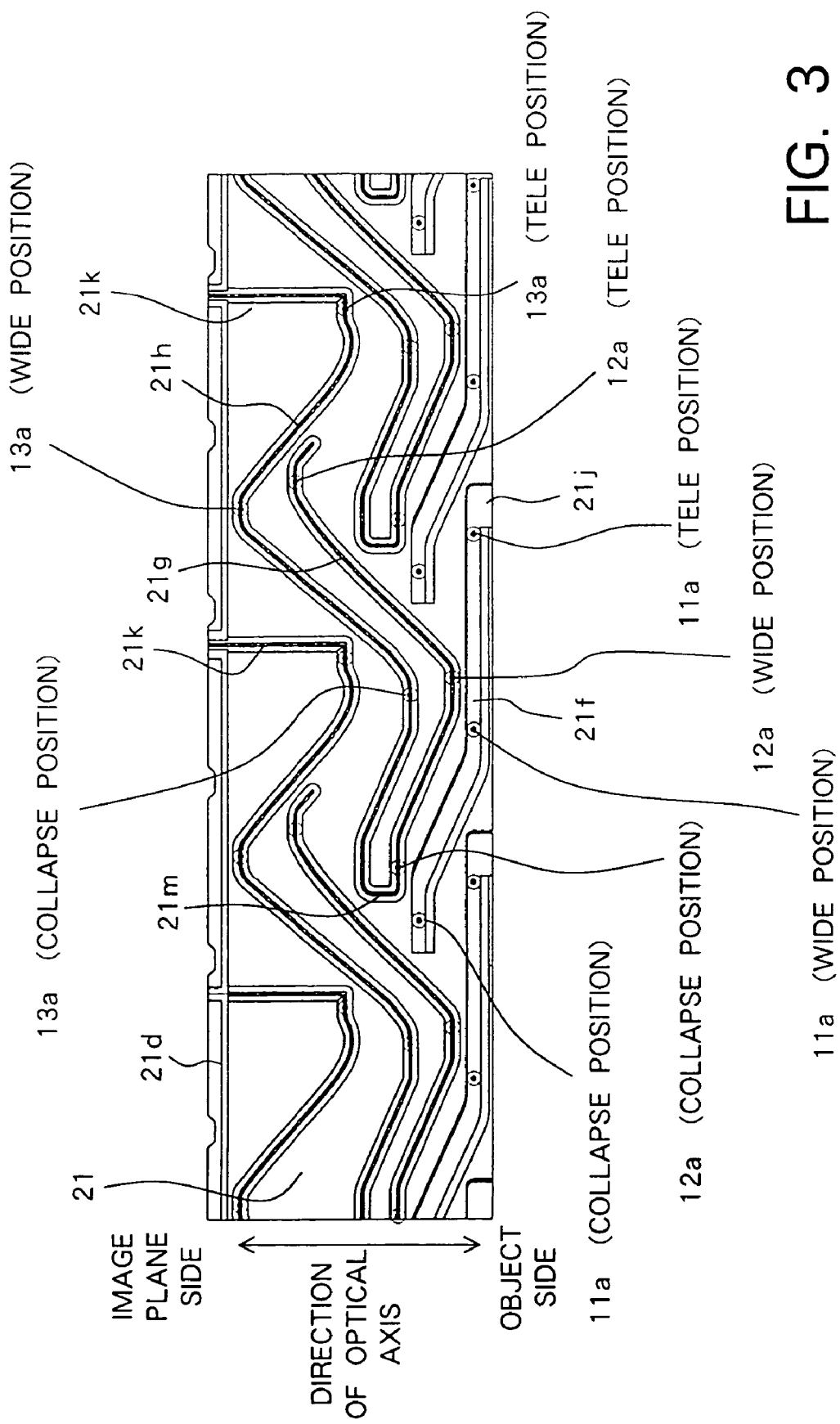
FIG. 3 is an inner exploded view of a movable cam ring.

In FIG. 3, reference numerals 21f, 21g and 21h denote cam groove portions with which the cam followers 11a, 12a and 13a of the first holding barrel 11, second holding barrel 12 and third holding barrel 13 engage respectively. Reference numerals 21j and 21k denote guide groove portions which guide the cam followers 11a, 12a and 13a into the cam groove portions 21f, 21g and 21h when the lens barrel is assembled. Reference numeral 21m denotes a coupling groove portion which couples the cam groove portion 21g with the cam groove portion 21h.

As described above, since one of the cam followers 12a and 13a (including three cam followers) is a movable cam follower energized by means of a spring, it can stabilize the driving loads of the second holding barrel 12 and third holding barrel 13, eliminate play between the cam groove portions 21g and 21h, and the cam followers 12a and 13a to prevent the lens units 2 and 3 from decentering with respect to the optical axis.

In this embodiment, the cam groove portions 21g and 21h have a sharp gradient between the collapse position and the WIDE position or between the WIDE position and TELE position, and therefore the width of the movable cam ring 21 (length in the direction of the optical axis) needs to be wide enough to form the cam groove portions 21g and 21h. Here, to reduce the size of the movable cam ring 21 (lens barrel) in the direction of the optical axis, the cam groove portion 21g and cam groove portion 21h need to be arranged close to each other as shown in FIG. 3.

In this way, arranging the cam groove portion 21g and cam groove portion 21h close to each other eliminates the area in the movable cam ring 21 for forming a guide groove portion to guide the cam follower 12a of the second holding barrel 12 into the cam groove portion 21g. Furthermore, when the first holding barrel 11, second holding barrel 12 and third holding barrel 13 are incorporated in the movable cam ring 21, attempting to incorporate the first holding barrel 11 from the same direction as that in which the second holding barrel 12 and third holding barrel 13 are incorporated eliminates the area for forming the guide groove portions to guide the cam followers 11a of the first holding barrel 11 into the cam groove portions 21f.

In this embodiment, as shown in FIG. 3, the guide groove portions 21j of the first holding barrel 11 (cam followers 11a) are formed at one end (object side) of the movable cam ring 21 and the guide groove portions 21k of the second holding barrel 12 (cam followers 12a) and third holding barrel 13 (cam followers 13a) are formed at the other end (image plane side) of the movable cam ring 21, therefore the second holding barrel 12 and the third holding barrel 13 are incorporated into the movable cam ring 21 from a direction different from the direction in which the first holding barrel 11 is incorporated into the movable cam ring 21.

In correspondence with the above described incorporation directions, the rectilinear propagation guide groove portion 26a is formed up to one end (end on the object side) of the rectilinear propagation guide ring 26 and the rectilinear propagation guide groove portions 26b and 26c are formed up to the other end (end on the image plane side) of the rectilinear propagation guide ring 26 (see FIG. 2). This allows the first holding barrel 11 to be incorporated from the one end of the rectilinear propagation guide ring 26 and the second holding barrel 12 and the third holding barrel 13 to be incorporated from the other end of the rectilinear propagation guide ring 26.

Furthermore, the cam groove portion 21g and cam groove portion 21h are coupled by the coupling groove portion 21m and the second holding barrel 12 and the third holding barrel 13 are incorporated from one guide groove portion 21k into the movable cam ring 21. That is, when the second holding barrel 12 and the third holding barrel 13 are incorporated into the movable cam ring 21, the cam follower 12a of the second holding barrel 12 is first allowed to pass through the cam groove portion 21h and coupling groove portion 21m and then guided into the cam groove portion 21g and thereby the second holding barrel 12 is incorporated in the movable cam ring 21. Then, the cam follower 13a of the third holding barrel 13 is introduced into the cam groove portion 21h and thereby the third holding barrel 13 is incorporated into the movable cam ring 21.

As described above, by adopting a structure capable of forming the cam groove portion 21h and the cam groove portion 21g close to each other and incorporating the holding barrels 11, 12 and 13 from both ends of the movable cam ring 21, it is possible to reduce the diameter of the movable cam ring 21 (lens barrel) and the length in the direction of the optical axis.

Then, the driving mechanism of the fourth lens unit 4 which performs a focusing operation by moving in the direction of the optical axis will be explained.

In FIG. 2, the fourth holding barrel 14 which holds the fourth lens unit 4 is supported by a main guide bar (not shown) arranged in parallel to the optical axis and is movable along this main guide bar. Furthermore, a sub-guide bar is arranged in parallel to the optical axis on the substantially opposite side of the main guide bar across the optical axis and a rotation stopper provided on the external surface of the fourth holding barrel 14 engages with the sub-guide bar in a slidable manner.

A nut bearing portion whose cross section is horseshoe-shaped is provided in the vicinity of the main guide bar of the fourth holding barrel 14, and this nut bearing portion is provided with a nut 15 which engages with a lead screw portion 27a of the focus motor 27. The rotation of the nut 15 is blocked by a rotation stopper (not shown), and therefore when the focus motor 27 (lead screw portion 27a) rotates, the nut 15 moves along the lead screw portion 27a. This allows the fourth holding barrel 14 (fourth lens unit 4) to move in the direction of the optical axis and stop at a predetermined in-focus position.

The one ends of the above described main guide bar and sub-guide bar are fixed to a CCD holder 24 and the other ends are fixed to a fourth cap 29. Furthermore, the end of the lead screw portion 27a of the focus motor 27 is fixed to the fourth cap 29.

Then, the structure of the stop shutter unit and ND unit will be explained.

In FIG. 2, reference numeral 31 denotes a stop blade, 32 denotes a pinwheel which drives the stop blade 31, 33 denotes a stop base plate. Reference numeral 34 denotes a shutter blade, 35 denotes a shutter base plate, 36 denotes a shutter cover and 52 denotes a shutter yoke. The stop shutter unit is made up of these members. Reference numeral 41 denotes an ND base plate, 42 denotes an ND blade and 43 denotes an ND cover. The ND unit is made up of these members.

The structure of the stop shutter unit will be explained using FIGS. 4, 5 and 6.

Figure 4:
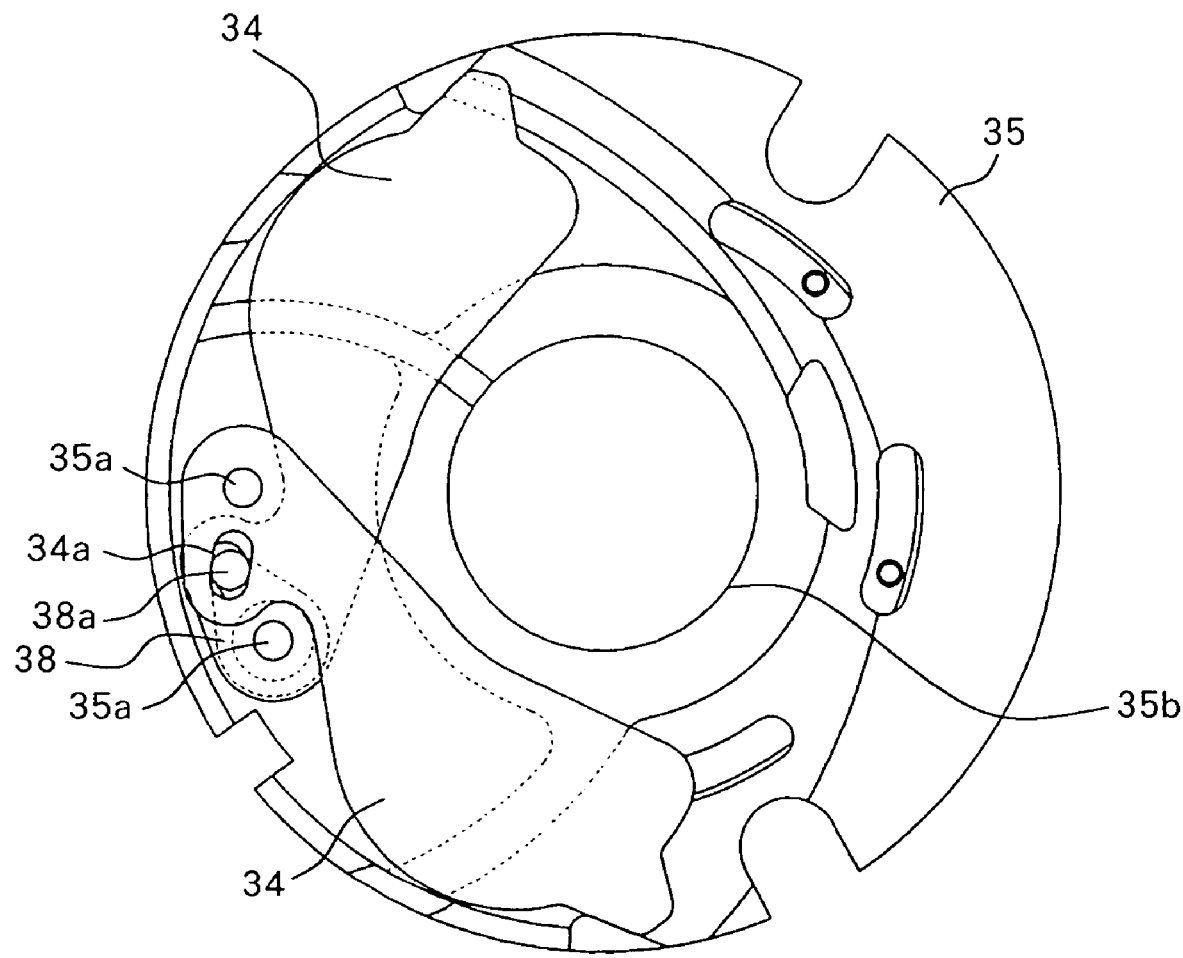
FIG. 4 is a front view of a stop shutter unit when a shutter cover is removed.

FIG. 4 is a front view of the stop shutter unit when the shutter cover 36 is removed. FIG. 4 shows the state in which the two shutter blades 34 have moved away from the opening 35b serving as a hole portion for light passage formed in the shutter base plate 35.

Each shutter blade 34 is supported to the rotation shaft 35a formed on the shutter base plate 35 in a rotatable manner and a driving pin 38a formed at the end of the driving lever 38 (shown by a dotted line in FIG. 4) engages with a long hole portion 34a formed at the end (rotation shaft side) of each shutter blade 34. The driving lever 38 receives a driving force from a driving unit which will be described later and can rotate and through this rotation, each shutter blade 34 rotates around each rotation axis 35a. In this way, the two shutter blades 34 open/close the opening 35b.

Figure 5:
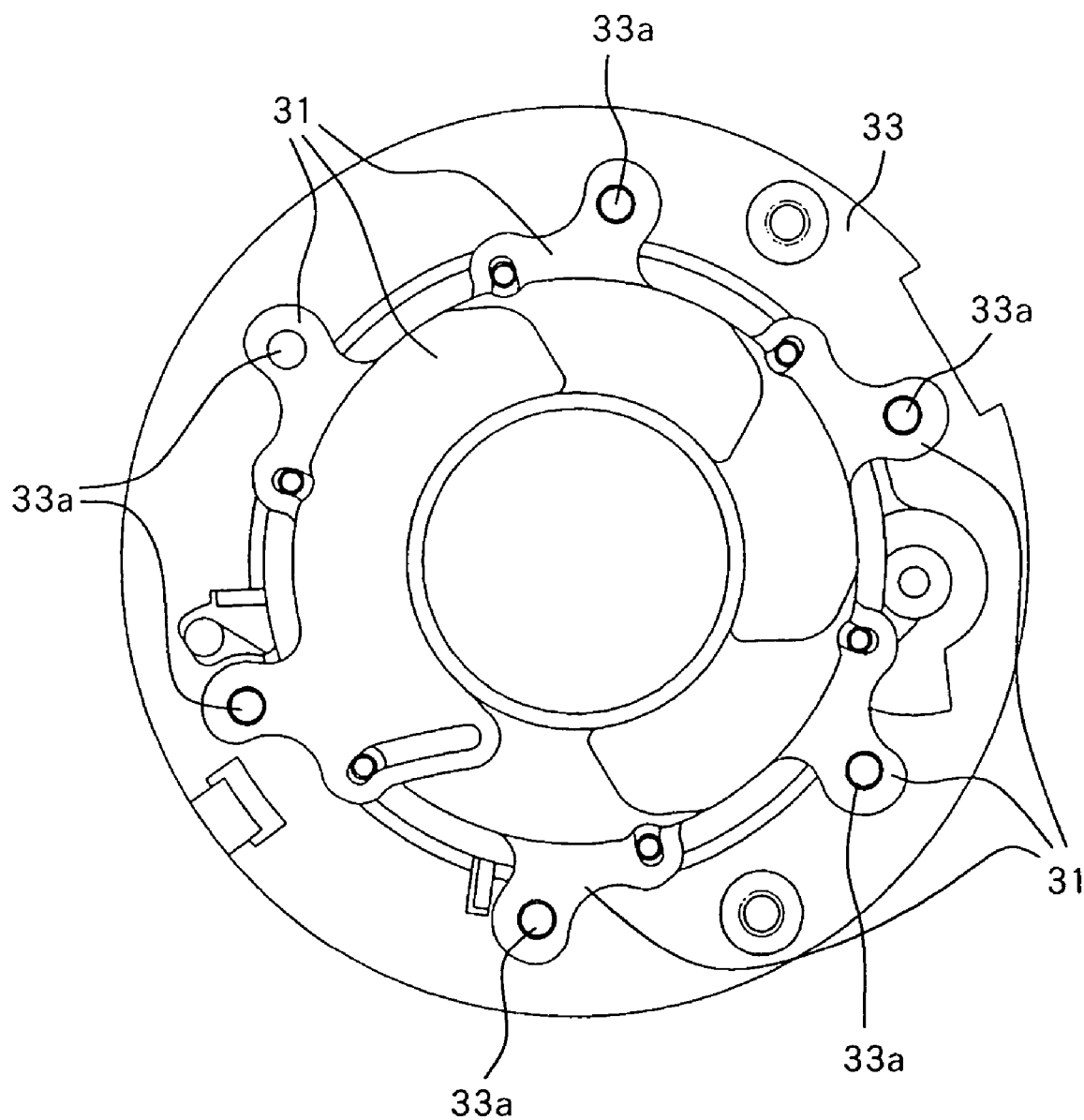
FIG. 5 is a front view of the stop shutter unit when a shutter base plate is removed from the state shown in FIG. 4.

FIG. 5 is a front view of the stop shutter unit when shutter blades 34 and shutter base plate 35 are removed from the state shown in FIG. 4. In FIG. 5, six stop blades 31 of the same shape are supported to the rotation shafts 33a formed on the stop base plate 33 in a rotatable manner.

Figure 6:
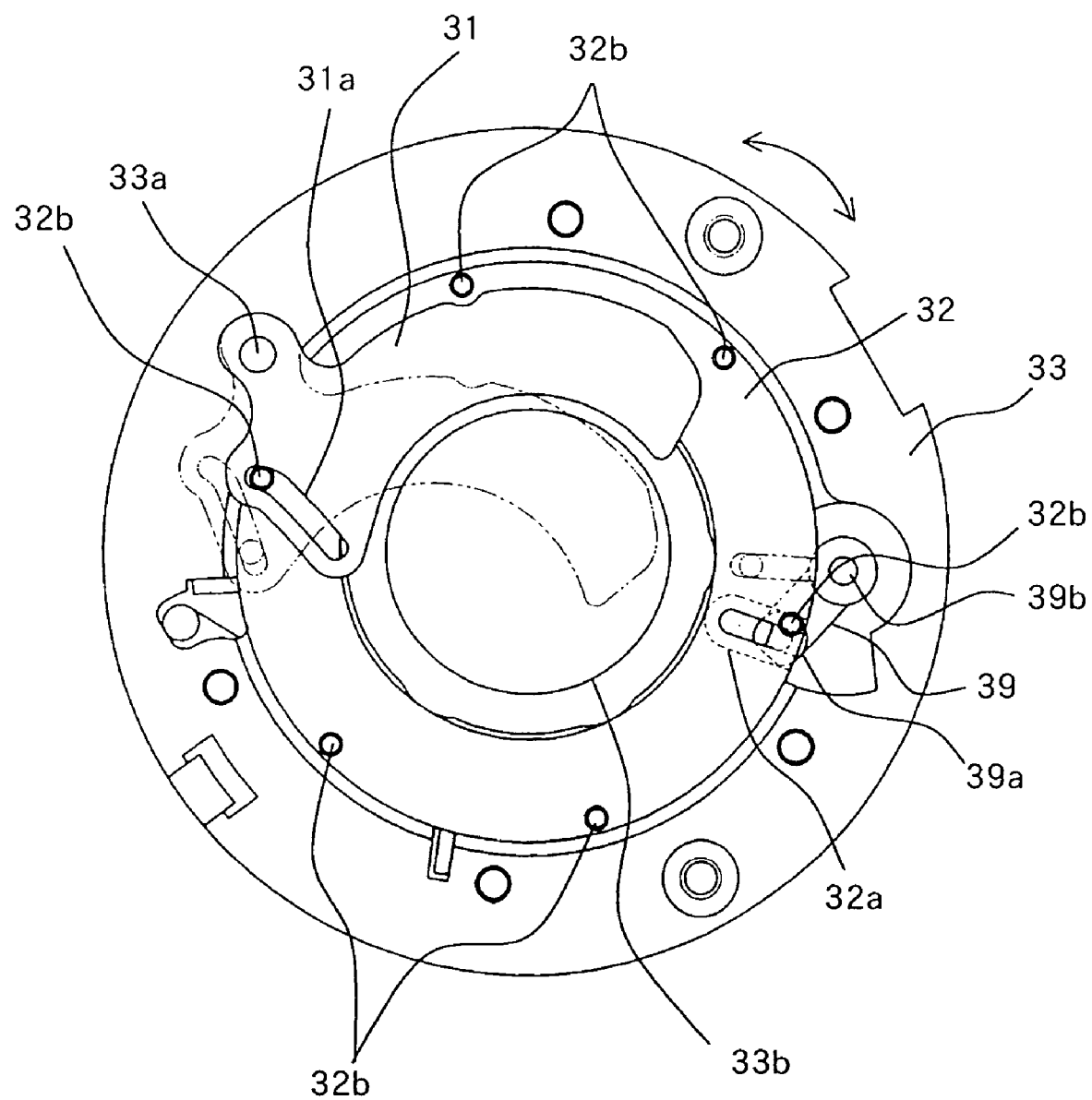
FIG. 6 is a front view of the stop shutter unit when five stop blades are removed from the state shown in FIG. 5.

FIG. 6 is a front view of the stop shutter unit when the five stop blades 31 are removed from the state shown in FIG. 5.

In FIG. 6, reference numeral 39 denotes a driving lever which drives (rotates) a pinwheel 32 and is rotatable around a shaft 39b. A pin 39a is provided at the end of the driving lever 39 and the pin 39a engages with a long hole portion (shown with a dotted line in FIG. 6) 32a formed on the back of the pinwheel 32.

When the driving lever 39 rotates, the pinwheel 32 rotates around the optical axis (direction shown by an arrow in the figure) through the engagement between the pin 39a and long hole portion 32a. Six pins 32b are formed on the pinwheel 32 and these pins 32b engage with the cam groove portions 31a formed in the stop blades 31.

In the above described structure, when the pinwheel 32 rotates, the stop blades 31 rotate around the rotation shafts 33a through the cam engagement between the pin 32b and cam groove portion 31a and move forward or backward to/from the opening 33b formed in the stop base plate 33. This operation changes the area of the opening of light passage (aperture diameter).

Figure 7:
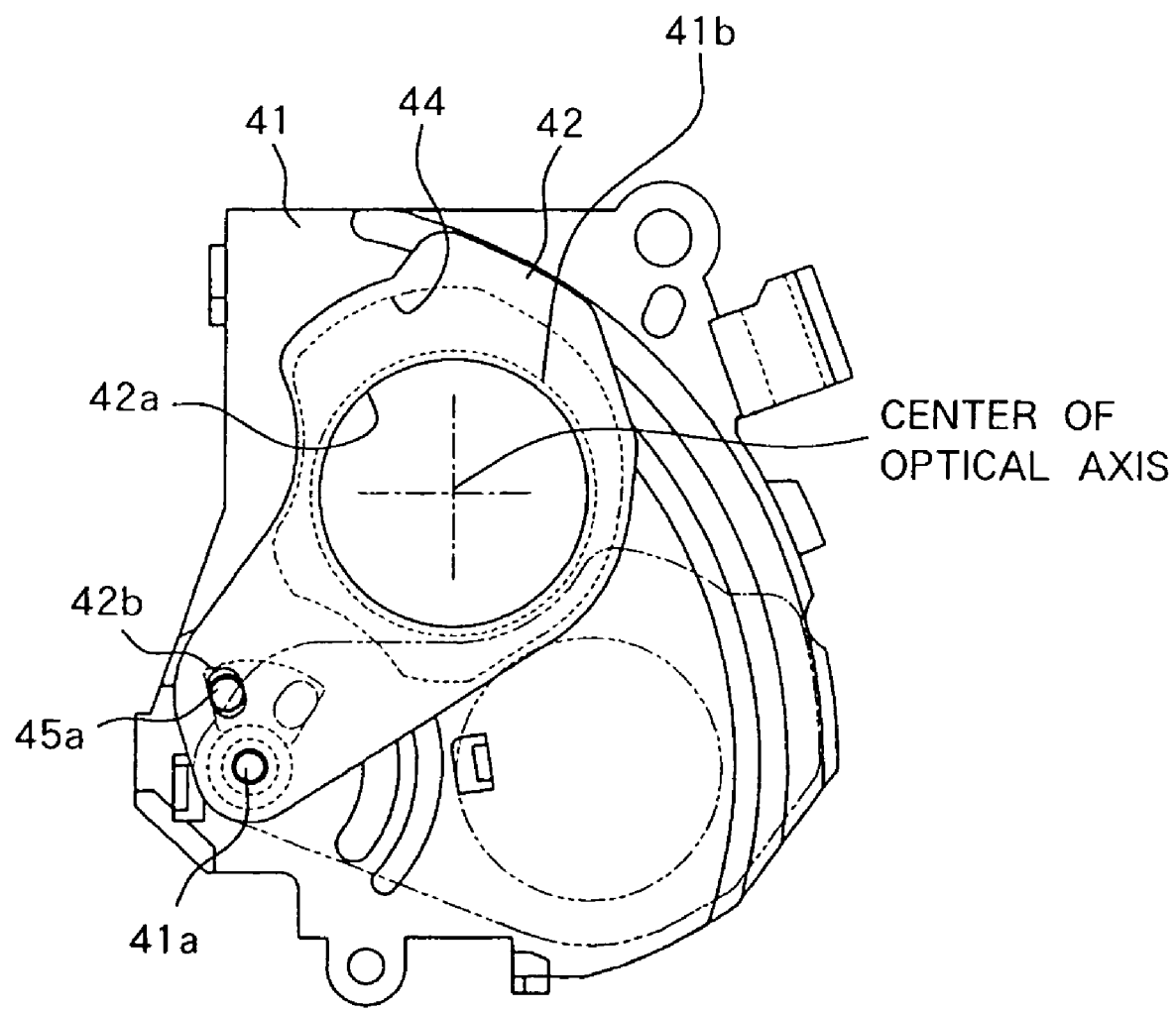
FIG. 7 is a front view of an ND unit when an ND cover is removed.

Then, the structure of the ND unit will be explained using FIG. 7. FIG. 7 is a front view of the ND unit when the ND cover 43 is removed.

In FIG. 7, reference numeral 42a denotes an opening formed in the ND blade 42. Reference numeral 44 denotes an ND filter (optical filter shown by a dotted line in the figure) which is attached to the ND blade 42 and covers the opening 42a. Reference numeral 41a denotes a rotation shaft formed on the ND base plate 41 and supports the ND blade 42 in a rotatable manner. Reference numeral 45a denotes a driving pin formed on a rotatable driving lever 45 (see FIG. 8), the driving pin 45a engages with a long hole portion 42b formed in the end side (rotation shaft 41a side) of the ND blade 42.

In the above described structure, when the driving lever 45 rotates, the ND blade 42 rotates around the rotation shaft 41a through the engagement between the driving pin 45a and long hole portion 42b. That is, when the ND blade 42 moves with respect to the opening (shown with a dotted line in FIG. 7) 41b formed in the ND base plate 41, the opening 41b can be covered with the ND filter 44. At this time, the amount of light incident on the image plane is restricted by the action of the ND filter 44. Furthermore, when the ND blade 42 moves to the position shown by a two-dot dashed line in FIG. 7, the ND filter 44 can be moved away from the opening 41b. The stop shutter unit and the ND unit are fixed to the third holding barrel 13 with screws (not shown).

Figure 8:
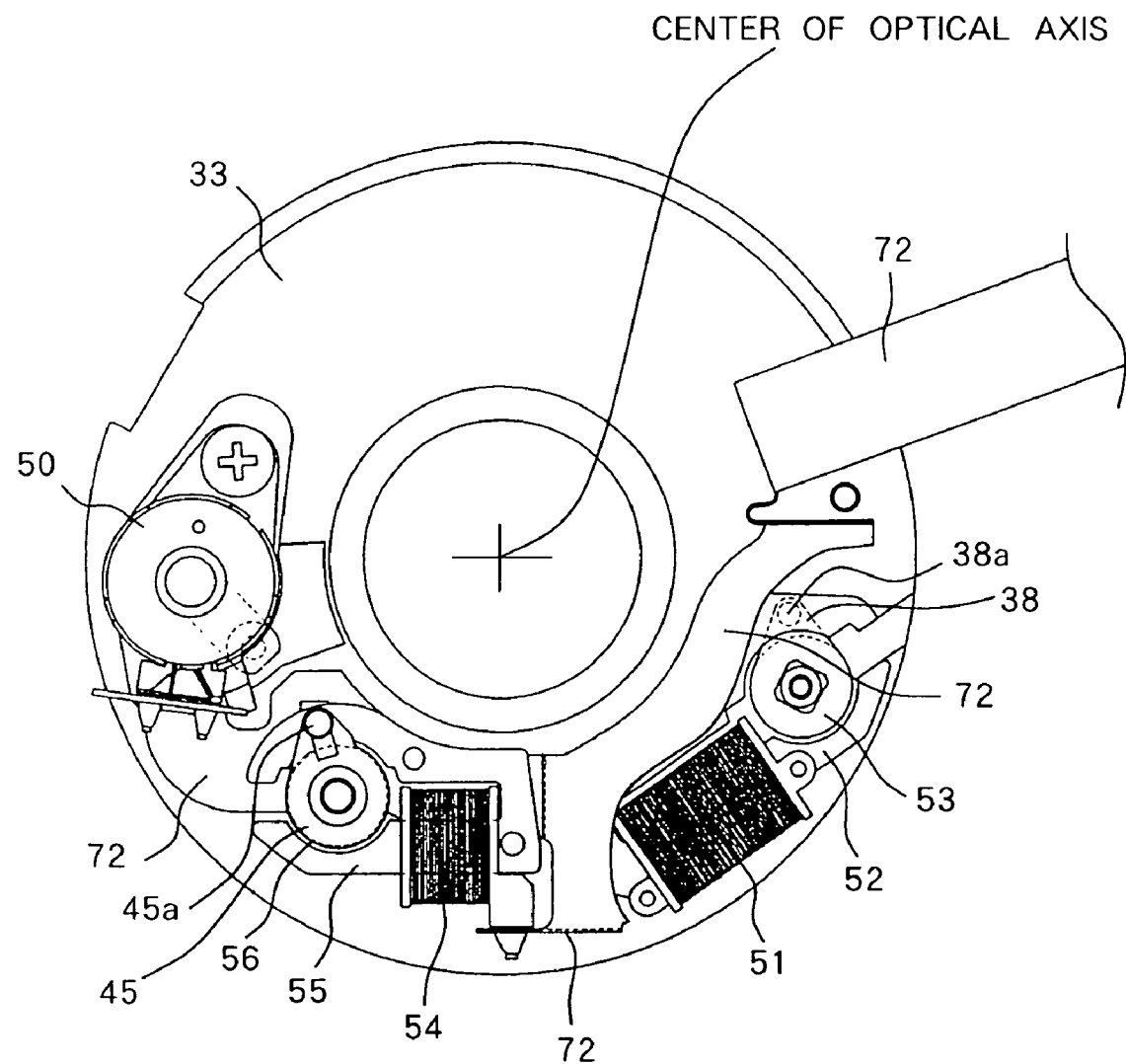
FIG. 8 is a rear view of the stop shutter unit.

Then, the driving unit for driving the stop blade 31, shutter blade 34 and ND blade 42 will be explained using FIG. 8. FIG. 8 is a rear view of a stop shutter unit.

In FIG. 8, reference numeral 50 denotes a stepping motor constituting a driving unit which drives the stop blade 31 and a driving lever 39 is connected to the output shaft of the stepping motor. In this embodiment, the stepping motor 50 is driven in micro steps to perform finer position control and thereby improve the stopping-down accuracy.

Reference numerals 51, 52 and 53 denote a coil, yoke and magnet, respectively which constitute the driving unit which drives the shutter blade 34. The magnet 53 rotates in a predetermined direction through a magnetic force generated when power is supplied to the coil 51. Here, since the driving lever 38 is attached to the magnet 53 as an integral part, the driving lever 38 also rotates together with the rotation of the magnet 53.

Reference numerals 54, 55 and 56 denote a coil, yoke and magnet, respectively which constitute the driving unit which drives the ND blade 42. The magnet 56 rotates in a predetermined direction through a magnetic force generated when power is supplied to the coil 54. Here, since the driving lever 45 is attached to the magnet 56 as an integral part, the driving lever 45 also rotates together with the rotation of the magnet 56.

In this embodiment, as shown in FIG. 2, the above described driving units which drive the stop blade 31, shutter blade 34 and ND blade 42 are arranged in the space which is in the periphery of the third lens unit 3 and formed between the stop blade 31 and the ND blade 42.

By arranging the respective driving units using a dead space formed between the stop blade 31 and the ND blade 42, it is possible to shorten (make thinner) the length of the third holding barrel 13 in the direction of the optical axis. Furthermore, since each driving unit is arranged in substantially the same position in the direction of the optical axis with respect to the third holding barrel 13, it is possible to shorten wiring of an FPC 72 which supplies power to the stepping motor 50, coils 51 and 54 compared to the case where the driving units are arranged in different positions in the direction of the optical axis with respect to the third holding barrel 13 and thereby reduce the cost or reduce power loss.

Here, when the three types of blades; stop blade 31, shutter blade 34 and ND blade 42 and the driving units to drive these blades are arranged on one side (object side or image plane side) of the lenses (third holding barrel 13), another movable area for other blades needs to be provided in a area other than the movable area of one of the blades 31, 34 and 42. Thus, arranging the stop blade 31, shutter blade 34 and ND blade 42 altogether in the lens barrel will result in an increase of side of the lens barrel because the movable areas for the blades 31, 34 and 42 need to be secured.

Thus, in this embodiment, the stop blade 31 and shutter blade 34 are arranged on the object side with respect the third holding barrel 13 (third lens unit 3) and the ND blade 42 is arranged on the image plane side with respect to the third holding barrel 13 (third lens unit 3). A space which serves as the movable areas for three kinds of blades 31, 34 and 42 are formed at both ends of the third holding barrel 13, thereby increases the degree of design freedom in forming the movable areas for the blades 31, 34 and 42 compared to the above described case where three kinds of blades 31, 34 and 42 are arranged together on one side of the third holding barrel 13 and can thereby efficiently arrange the blades and driving units which drive them in the lens barrel taking into account the movable areas of the blades 31, 34 and 42 and repress the size of the lens barrel size from increasing.

Then, in the above described structure, by arranging the driving units of the blades 31, 34 and 42 in the dead space formed between the stop blade 31 and ND blade 42, it is possible to reduce the size of the lens barrel compared to the case where the space for the arrangement of the driving units is separately secured in the lens barrel.

In this embodiment, the stop blade 31 and shutter blade 34 are arranged at one end of the third holding barrel 13 and the ND blade 42 is arranged at the other end, but this arrangement (structure) can take any other forms. That is, any one of the stop blade 31, shutter blade 34 and ND blade 42 can be arranged at one end of the third holding barrel 13 and the other blades can be arranged at the other end. Then, the driving units can be arranged in the space between the blades arranged at both ends of the third holding barrel 13.

Furthermore, in this embodiment, as shown in FIG. 8, the driving units are arranged on substantially the same circumference centered on the optical axis. This allows the driving units to be more efficiently arranged in the diameter direction on the lens barrel, compared to the arrangement of the driving units in the diameter direction of the lens barrel, and can thereby reduce the size in the diameter direction of the third holding barrel 13 and reduce the size in the diameter direction of the lens barrel.

Figure 9:
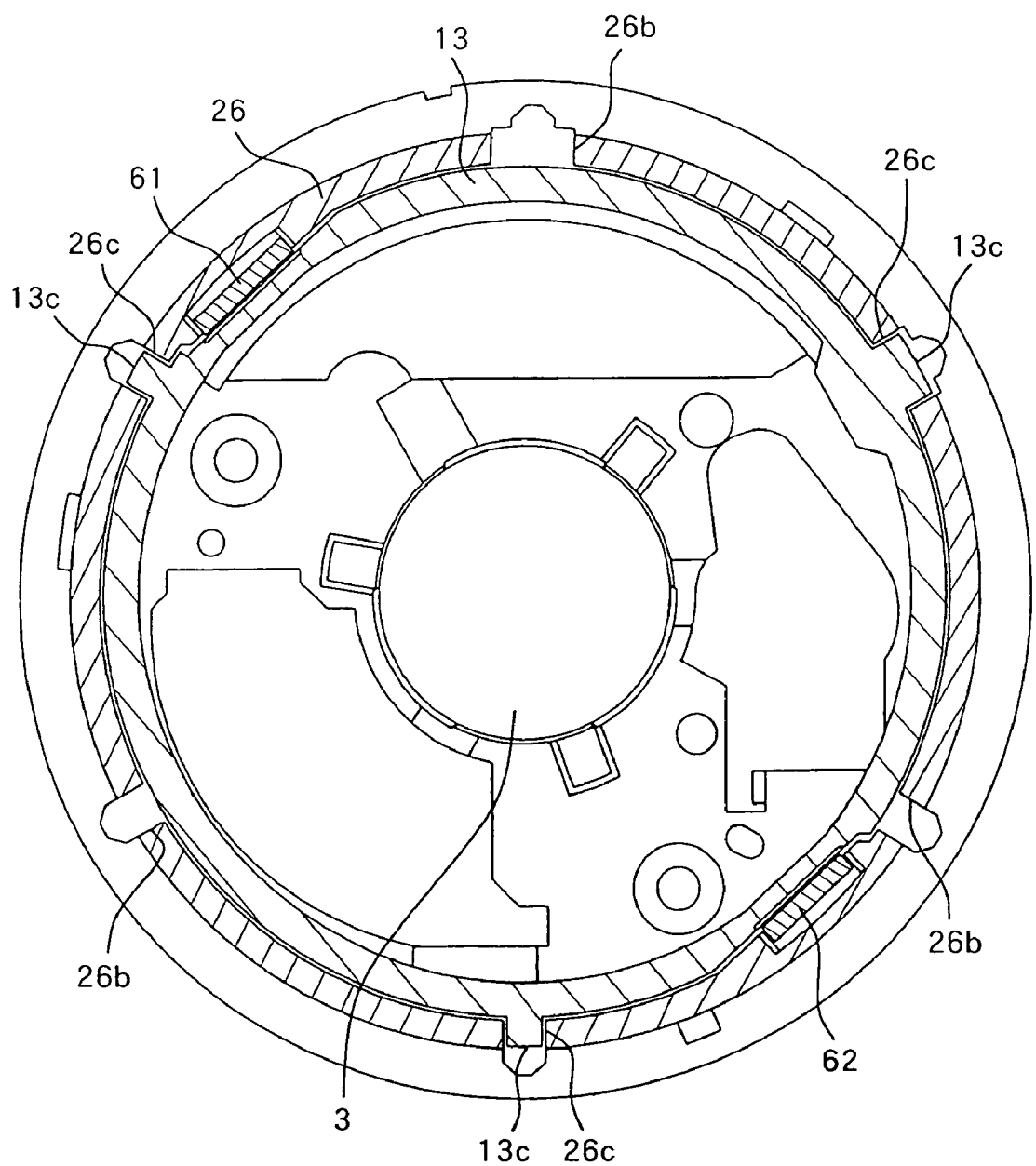
FIG. 9 is a sectional view along a line A-A in FIG. 2.

Then, FIG. 9 shows a sectional view along a line A-A in FIG. 2.

In FIG. 9, reference numerals 61 and 62 denote the aforementioned rotation blocking keys. Reference numeral 13c denotes ribs (second engaging portion) formed on the external surface of the third holding barrel (lens holding member) 13 as integral parts, which extend in the direction of the optical axis. These ribs 13c are fitted in the rectilinear propagation guide groove portion 26c (first engaging portion) that extends in the direction of the optical axis and is formed in the rectilinear propagation guide ring 26 (second member) with a certain gap. The ribs 13c are provided in three locations (can be any number of locations) in the circumferential direction of the third holding barrel 13 with substantially the same distance.

Here, the third holding barrel 13 holds the stop shutter unit and the ND unit, and therefore the third holding barrel 13 has large weight. As is apparent from FIG. 2, the center of gravity of the third holding barrel 13 is located distant from the cam follower 13a serving as a support portion of the third holding barrel 13 in the direction of the optical axis. Because of this, when external shock is given to the lens barrel, the third holding barrel 13 is tilted with respect to the optical axis, which may cause the cam follower 13a to come off the cam groove portion of the movable cam ring 21 (first member).

In this embodiment, the ribs 13c extending in the direction of the optical axis are fitted in the rectilinear propagation guide groove portion 26c of the rectilinear propagation guide ring 26 so that when the third holding barrel 13 is tilted, the ribs 13c contact the end surface of the rectilinear propagation guide groove portion 26c to prevent the third holding barrel 13 from tilting. On the other hand, because a sufficient clearance is provided between the ribs 13c and the rectilinear propagation guide groove portion 26c of the rectilinear propagation guide ring 26, when the lens barrel is driven, the ribs 13c do not contact the rectilinear propagation guide groove portion 26c and do not constitute any driving load on the lens barrel due to frictional resistance between the ribs 13c and the rectilinear propagation guide groove portion 26c.

In this embodiment, the ribs 13c are formed in the third holding barrel 13 which has large weight and the third holding barrel 13 is prevented from tilting through the contact between the ribs 13c and the rectilinear propagation guide groove portion 26c, but it is also possible to form the above described ribs in other holding barrels 11, 12 and 14 to prevent these holding barrels from tilting. In this embodiment, the rib 13c is formed on the third holding barrel and the rectilinear propagation guide groove portion 26c is formed in the rectilinear propagation guide ring 26, but a groove portion (corresponding to the rectilinear propagation guide groove portion 26c) can be formed in the third holding barrel and a projection portion (corresponding to the rib 13c) can be formed on the rectilinear propagation guide ring 26.

Figure 10:
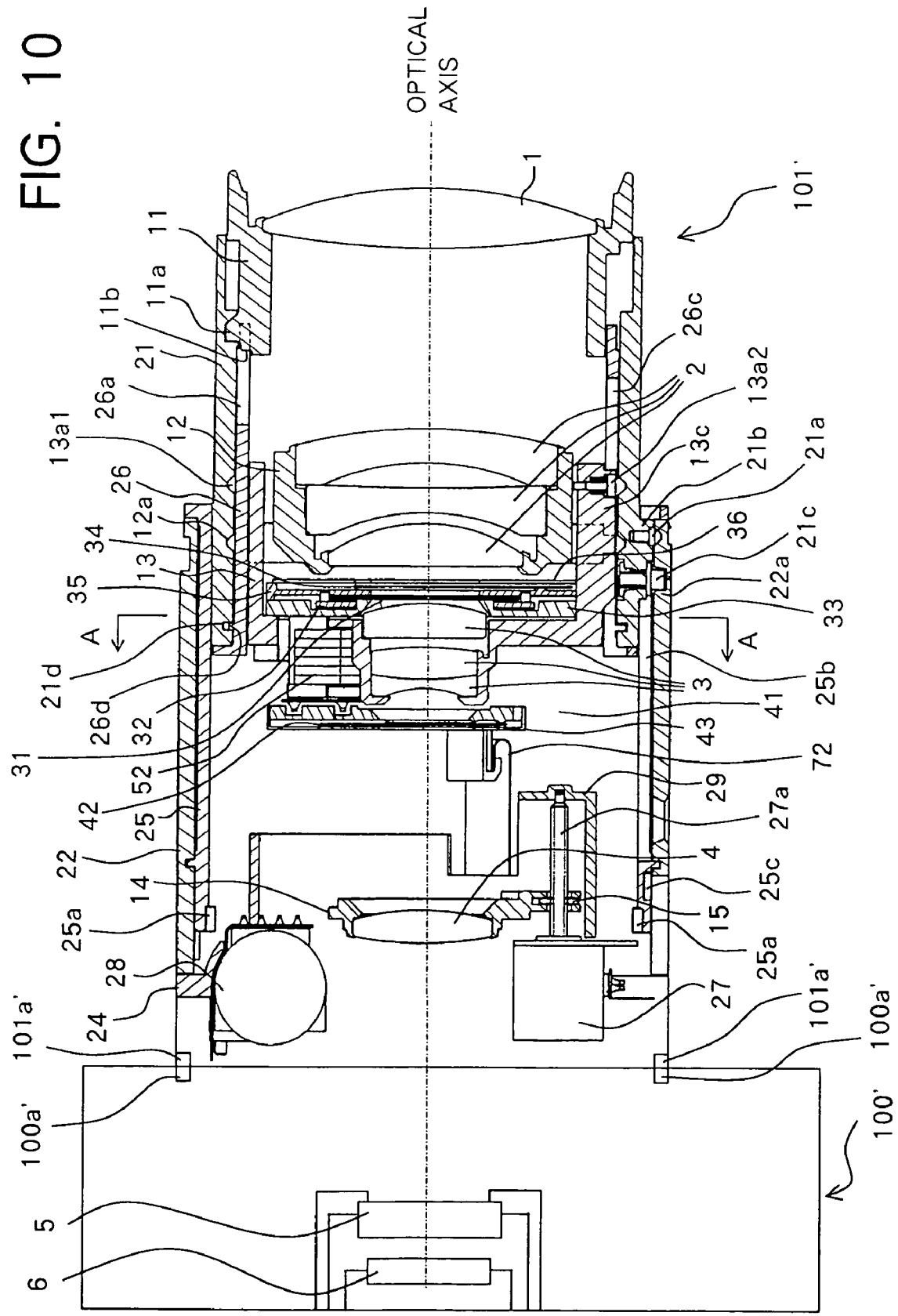
FIG. 10 is a sectional view of a camera system.

The above described embodiment has described a lens-integral type camera, but as shown in FIG. 10, the present invention is also applicable to a camera system comprising a camera 100' and a lens apparatus 101' which is mounted on a camera mount 100a' of the camera 100' through a lens mount 101a'. In FIG. 10, the same members as those explained in the above-described embodiment are assigned the same reference numerals and explanations thereof will be omitted. In this camera system, a low pass filter 5 and an image pickup element 6 are provided inside the camera 100'.

What is claimed is:

1. A lens apparatus comprising:
   direction of the lens,
      wherein one or two members selected from the group consisting of the stop blade, the optical filter and the shutter blade is/are arranged at one end side of the lens holding member and the other members or member selected from the group are/is arranged at the other end side of the lens holding member.

2. The lens apparatus according to claim 1, further comprising:
   a stop driving unit which drives the stop blade;
   a filter driving unit which drives the optical filter; and
   a shutter driving unit which drives the shutter blade,
      wherein the stop driving unit, the filter driving unit and the shutter driving unit are arranged on outside of the lens holding member and between one member arranged at one end side of the lens holding member and the other member arranged at the other end side of the lens holding member.

3. The lens apparatus according to claim 2, wherein the stop driving unit, the filter driving unit and the shutter driving unit are arranged in the circumferential direction of the lens holding member.

4. The lens apparatus according to claim 1, further comprising:
   a first member which rotates around an optical axis and transmits a driving power to the lens holding member; and
   a second member which includes a first engaging portion to guide the lens holding member in the direction of the optical axis,
   wherein the lens holding member includes a second engaging portion which extends in the direction of the optical axis and engages with the first engaging portion.

5. A camera system comprising:
   the lens apparatus according to claim 1; and
   a camera comprising an image pickup element which photoelectrically converts an object image formed by lens in the lens apparatus into an electric signal.

6. A camera which is provided with a lens apparatus in an integrated manner comprising:
   direction of the lens,
      wherein one or two members selected from the group consisting of the stop blade, the optical filter and the shutter blade is/are arranged at one end side of the lens holding member and the other members or member selected from the group are/is arranged at the other end side of the lens holding member.

7. The camera according to claim 6, further comprising:
   a stop driving unit which drives the stop blade;
   a filter driving unit which drives the optical filter; and
   a shutter driving unit which drives the shutter blade,
      wherein the stop driving unit, the filter driving unit and the shutter driving unit are arranged on outside of the lens holding member and between one member arranged at one end side of the lens holding member and the other member arranged at the other end side of the lens holding member.

8. The camera according to claim 7, wherein the stop driving unit, the filter driving unit and the shutter driving unit are arranged in the circumferential direction of the lens holding member.

9. The camera according to claim 6, further comprising:
   a first member which rotates around an optical axis and transmits a driving power to the lens holding member; and
   a second member which includes a first engaging portion to guide the lens holding member in the direction of the optical axis,
   wherein the lens holding member includes a second engaging portion which extends in the direction of the optical axis and engages with the first engaging portion.

* * * * *